United States Patent
Balasubramanian et al.

(10) Patent No.: US 12,382,537 B2
(45) Date of Patent: Aug. 5, 2025

(54) METHOD AND APPARATUS FOR WIDER BANDWIDTH gNodeB OPERATION WITH USER EQUIPMENT BANDWIDTH RESTRICTIONS

(71) Applicant: Celona, Inc., Campbell, CA (US)

(72) Inventors: Srinivasan Balasubramanian, San Diego, CA (US); Shashideep Nuggehalli, Campbell, CA (US); Satish Ananthaiyer, Campbell, CA (US); Mehmet Yavuz, Palo Alto, CA (US)

(73) Assignee: CELONA, INC., Campbell, CA (US)

( * ) Notice: Subject to any disclaimer, the term of this patent is extended or adjusted under 35 U.S.C. 154(b) by 182 days.

(21) Appl. No.: 18/179,950

(22) Filed: Mar. 7, 2023

(65) Prior Publication Data

US 2023/0292393 A1     Sep. 14, 2023

Related U.S. Application Data

(60) Provisional application No. 63/317,517, filed on Mar. 7, 2022.

(51) Int. Cl.
*H04W 76/27* (2018.01)
*H04W 72/12* (2023.01)

(52) U.S. Cl.
CPC ........... *H04W 76/27* (2018.02); *H04W 72/12* (2013.01)

(58) Field of Classification Search
CPC ... H04W 76/27; H04W 72/12; H04W 72/231; H04W 72/0453
See application file for complete search history.

(56) References Cited

U.S. PATENT DOCUMENTS

| | | | | |
|---|---|---|---|---|
| 2019/0349060 A1* | 11/2019 | Liao | ...................... | H04B 7/0695 |
| 2023/0199812 A1* | 6/2023 | Lei | ...................... | H04W 56/001 |
| | | | | 370/329 |
| 2023/0292372 A1* | 9/2023 | Kang | .................. | H04W 74/006 |

FOREIGN PATENT DOCUMENTS

WO     WO-2022030863 A1 *   2/2022   ............ H04W 48/08

\* cited by examiner

*Primary Examiner* — Jae Y Lee
*Assistant Examiner* — Nam P. Cao
(74) *Attorney, Agent, or Firm* — Jaquez Land Greenhaus & McFarland, LLP; Bruce W. Greenhaus

(57) ABSTRACT

A first referred to as Approach A has three 40 MHz BWPs. The first BWP of the BWP configuration 2, approach A referred to as "BWP #1" resides in the top of the 100 MHz bandwidth. A second approach referred to as "BWP #2" resides in the middle portion of the 100 MHz band. A third approach referred to as "BWP #3" resides in the bottom portion of the 100 MHz band. BWP configuration 2, approach A allows overlaps between the BWP #1 and BWP #2 and also between BWP #2 and BWP #3. These overlaps can be leveraged to allow a diversity of users to be scheduled across BWPs #1 and #2 and between BWPs #2 and #3. In some embodiments, BWP #2 aligns with BWP Configuration 1 users.

10 Claims, 1 Drawing Sheet

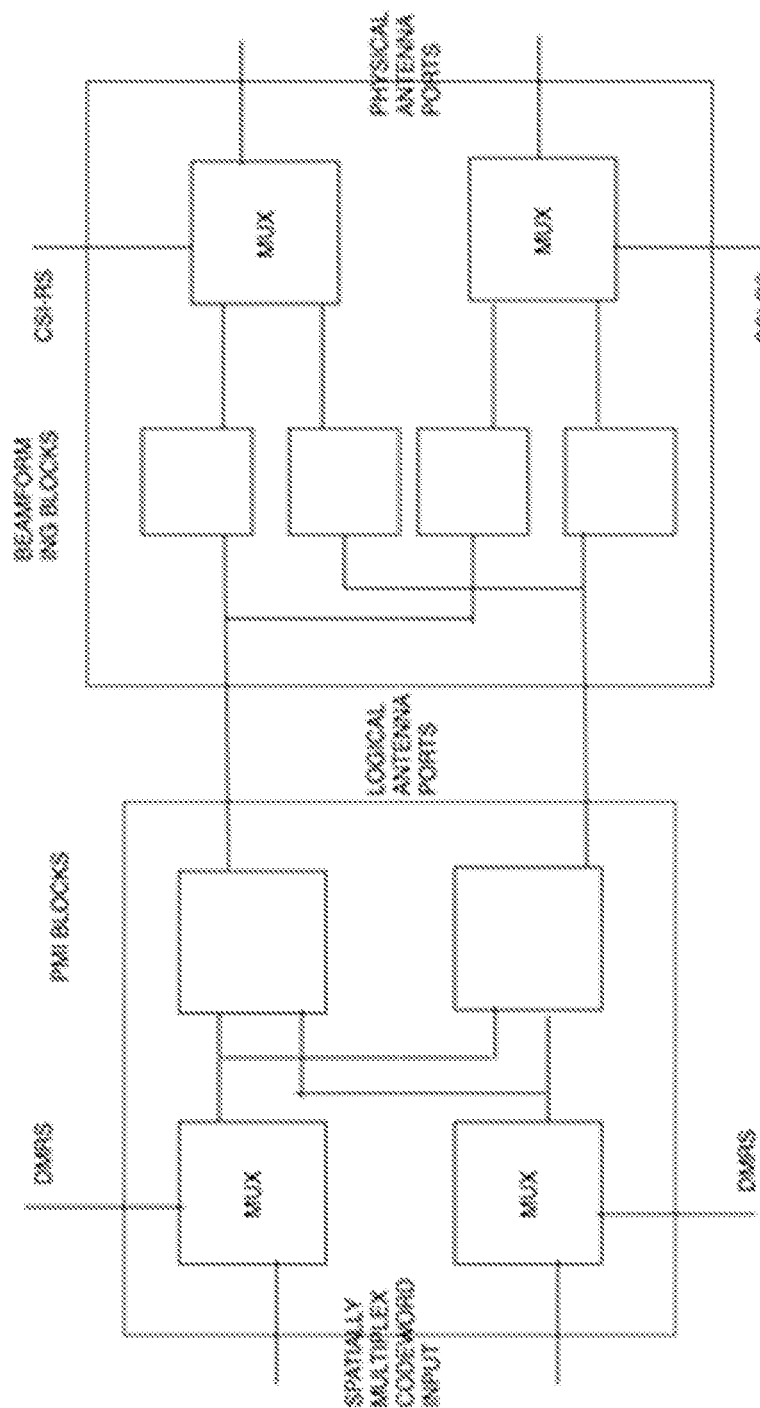

METHOD AND APPARATUS FOR WIDER BANDWIDTH gNodeB OPERATION WITH USER EQUIPMENT BANDWIDTH RESTRICTIONS

CLAIM OF PRIORITY TO PREVIOUSLY FILED PROVISIONAL APPLICATION—INCORPORATION BY REFERENCE

This non-provisional application claims priority to an earlier-filed provisional application No. 63/317,517 filed Mar. 7, 2022, entitled "Method and Apparatus for Wider Bandwidth GNodeB Operation with User Equipment Bandwidth Restrictions" and the provisional application No. 63/317,517 filed Mar. 7, 2022, and all its contents, are hereby incorporated by reference herein as if set forth in full.

BACKGROUND (1) Technical Field

The disclosed method and apparatus relate generally to wireless communication systems. In particular, the disclosed method and apparatus relate to coordinating the bandwidth of a gNodeB within a communication network with the bandwidth being used by user equipment accessing the network through the eNodeB.

(2) Background

In fourth generation Long Term Evolution (4G/LTE) networks, User Equipment (UEs) support the maximum possible bandwidth, which is 20 MHz. In fifth generation networks (5G), transmission can be as wide as 400 MHz per carrier. It's impractical to expect every UE to support the full 400 MHz bandwidth. Therefore, the system is designed to support a 5G UE communicating on a portion the channel bandwidth of the gNodeB that is smaller than the total bandwidth of the gNodeB through which the UE is communicating with the 5G network. This smaller portion is commonly referred to as a Bandwidth Part (BWP).

In many cases, allocating a single bandwidth to a UE is also not the best use of radio resources. BWPs allow the use of dynamic adaptation. For example, with three service requirements: a first enhanced mobile broadband (eMBB) communication link with 100 Mbps/1 ms; a second eMBB link with 15 Mbps/0.5 ms; and a third link using r ultra-reliable low latency communications (URLCC) with 7 Mbps/0.25 ms. To meet these requirements, a UE may be configured with three BWPs, each with a different set of parameters, Multiple-In, Multiple-Out (MIMO) configuration, modulation, and so on. For example, one BWP may have more resource blocks and bandwidth to make it easier to achieve 100 Mbps; while another BWP may have a smaller bandwidth but gives lower latency due to a higher carrier spacing (i.e., "numerology").

However, some current limitations exist. For example, the uplink can only support up to 40 MHz due to transmit restrictions on the n48 band defined by New Radio (NR) 5G standards. The downlink can support up to 100 MHz. Currently, there are configurations that consist of a primary component carrier (PCC) of 40 MHz on the downlink and 40 MHz on the uplink with a secondary carrier of 100 MHz on the downlink. Furthermore, for time division duplex (TDD) systems, the downlink and the uplink need to be center frequency aligned. Another limitation is that currently, the Channel State Information Reference Signal (CSI-RS) is only provided on one antenna port. Also, there are issues related to the Additional Max Power Reduction (AMPR) regarding a UE automatically lowering power based on the uplink modulation and coding scheme (MCS) and the specific region of RE usage on n48.

Accordingly, it would be advantageous to provide a system that can overcome or mitigate some of these limitations.

BRIEF DESCRIPTION OF THE DRAWINGS

The disclosed method and apparatus, in accordance with one or more various embodiments, is described with reference to the following FIGURES. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 1 is an example of one embodiment of a precoding-beamforming paradigm.

The FIGURES are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Bandwidth Part (BWP) Management

In some embodiment of the disclosed method and apparatus, bandwidth parts (BWPs) can be configured to support the following configurations:
(1) BWP Configuration 1: 100 MHz downlink BWP+40 MHz uplink BWP; and
(2) BWP Configuration 2: 40 MHz downlink BWP+40 MHz uplink BWP.

BWP configuration 1 occupies the full BW on downlink and is aligned on the center frequency for the uplink. BWP configuration 2 may be placed anywhere in the 100 MHz band.

BWP configuration 2 has two approaches. A first is referred to as Approach A and has three 40 MHz BWPs. The first BWP of the BWP configuration 2, approach A is referred to as "BWP #1", and resides in the top of the 100 MHz bandwidth. The second is referred to as "BWP #2" and resides in the middle portion of the 100 MHz band. The third is referred to as "BWP #3" and resides in the bottom portion of the 100 MHz band. BWP configuration 2, approach A allows overlaps between the BWP #1 and BWP #2 and also between BWP #2 and BWP #3. These overlaps can be leveraged to allow a diversity of users to be scheduled across BWPs #1 and #2 and between BWPs #2 and #3. In some embodiments, BWP #2 aligns with BWP Configuration 1 users.

The second approach is referred to as "Approach B" and has three discrete BWPs having bandwidths of 40 MHz, 40 MHz, and 20 MHz, respectively. In Approach B, there are no overlaps between the three BWPs.

When using these configurations, some UEs are assigned to the BWP of the BWP Configuration 1 and other UEs are assigned to BWPs of the BWP Configuration 2. UEs can move across BWPs (change frequency assignments) based on the downlink and uplink capacity of the gNodeB and UE requirements and/or based on radio conditions. In some embodiments, BWP switching is triggered when there is a need for BWP adaptation (i.e., when the conditions are such that another BWP would be more appropriately adapted to the conditions). In some such embodiments, such adaptation is realized to maximize the system capacity and minimize the bit error rate in the aggregate of the UEs to which network service is being provided. In accordance with the disclosed method and apparatus for providing some gNodeB system designs, a BWP can be associated with a group of users that each have similar traffic requirements or that are being serviced by a channel with similar radio conditions.

In 5G NR networks, higher BW leads to higher energy requirements. Higher numerology (i.e., carrier spacing) leads to higher power needs due to the use of a higher speed clock. Therefore, unless the data rate usage is extremely high, the power efficiency will be lower. Nonetheless, BWP adaptation in accordance with the disclosed method and apparatus helps alleviate this problem.

BWP switching can be triggered either by a Radio Resource Control (RRC) signal, Downlink Control Information (DCI) message or by the expiration of an inactivity timer. In some embodiments, the use of a timer provides a system that is autonomous with respect to the UE.

In some embodiments, scheduling algorithms are set to schedule users of multiple BWPs at same instant or to share a single BWP at same instant. It should be noted that there might be an impact on scheduling of decisions on beamforming and on the hardware design in particular. Since the number of best correlated paths possible in a 2×2 MIMO design is 2 (i.e., 2 eigen values), energy can be focused (digital data) on one path or two paths. Physically, it can be viewed as having a maximum of two logical antenna ports that can be realized in a 2×2 system, with both mapped to specific physical antennas (also referred to as Channel State Information-Reference Signal (CSI-RS) antenna ports). Accordingly, there is no special advantage derived from either multi-BWP scheduling or single BWP scheduling at the same instant.

In some embodiments, BWP switching can be performed to switch from a default-BWP to a dedicated-BWP using an RRC Connection Reconfiguration. Users can be scheduled per transmission time interval (TTI) without being limited by similar BWP or multi-BWP limits at any instant of scheduling. In some embodiments, such scheduling is based on standard scheduling routines that will span all BWPs.

Link Adaptation and Power Control

Link adaptation and power control are complimentary algorithms that support the effective functioning of the scheduler. Link adaptation ensures the best possible utilization of the channel for a specific received signal to noise ratio (SNR). Link adaptation also latter ensures the SNR that is needed to achieve a desired "successful packet reception completion rate" using a particular Modulation and Coding Scheme (MCS).

A conservative and a tightly controlled power control loop together with a relatively aggressive link adaptation scheme can be used to optimize channel capacity. In some embodiments of the disclosed method and apparatus, tight interoperability of a scheduler and cost functionality with the link adaptation and power control functionality are established. The end goal is to maximize system capacity and capability and thereby enhance the "quality of experience" (QOE) delivered.

Some embodiments of the disclosed method and apparatus take into account the impact of multi BWP scheduling on the power control, link adaptation and cost functionality algorithms in the uplink. In some embodiments, each BWP can be set up for a single or a two layer MIMO arrangement. Furthermore, each BWP can be setup for either code book or non-code book-based transmission on the uplink. In some embodiments, MIMO is enabled either for all BWPs in the uplink or for none of the BWPs. Non-code book based transmissions are based on uplink Block Error Rate (BLER) and periodic CSI-RS measurements. In some embodiments, the impact of the ROT on L1 is taken into account with regard to the potential reconciliation of the transmission approach across BWPs in various hardware That is, in some embodiments, scheduling of multi BWPs can potentially lead to intercarrier interference, as the transmissions in the uplink are independent on each other and for different bandwidths. In particular, interference can be significant in the case of Discrete Fourier Transform Spread Orthogonal Frequency-Division Multiplexing (DFT-S-OFDM).

CSI-RS Management

The CSI-RS mechanism can be used for multiple purposes in a 5G network. Some of these uses include:
Path loss reference;
Channel estimation and measurement reporting;
Measurement reporting;
BWP Adaptation in the form of BWP switching;
Beam refinements in the UL; and
Interference managements;

In some embodiments of the disclosed method and apparatus, CSI-RS is setup on a per UE/per antenna basis, or per antenna basis. In some embodiments, multiple sets of CSRI Resource sets are set up for every UE to attend to different operational needs. In some such embodiments, the resource sets are established at multiple places in the resource grid and can be transmitted with a specific periodicity. In some embodiments, the CSI-RS configurations are setup in the frequency domain, and accounting for the width of the BWP. Accordingly, in some embodiments, specific resource sets are provided for specific UEs in specific BWPs.

Even if the CSI-RS post precoding-beamforming paradigm is punctured (an example implementation shown diagrammatically below in FIG. 1), the UE is not prevented from decoding the Physical Downlink Shared CHannel (PDSCH) data properly, since the UE knows how to calculate the frequency domain positions of the CSI-RS Resource Element (RE). Hence, there is no need to maintain a separate Start and Length Indicator Value (SLIV) for the PDSCH.

In a system using a 2×2 MIMO architecture, CSI-RS can potentially be used as a per antenna CRS, since the UE will additionally rely on a DeModulation Reference Signal (DMRS) for coherent demodulation of the PDSCH data. The same CRS can also be used for path loss calculation and reporting.

In some embodiments, the periodicity of CSI-RS can be considered independent of the Synchronization Signal Block (SSB), but the periodicity of CSI-RS has to be taken into consideration for both link adaptation and for the derivation of a proportional fair scheduler's Continuous Quality Improvement (CQI) coefficient.

The following is an example of the CSI-RS configuration in accordance with one embodiment of the disclosed method and apparatus on a per antenna/BWP basis:
nzp-CSI-RS-ResourceId: 0
resource Mapping
frequencyDomainAllocation: other (3)

other: 04 [bit length 6, 2 LSB pad bits, 0000 01 . . . decimal value 1]
nrofPorts: p2 (1)
firstOFDMSymbolInTimeDomain: 13
cdm-Type: fd-CDM2 (1)
density: one (1)
   one: NULL
freqBand
   startingRB: 0
   nrofRBs: 272
powerControlOffset: 0 dB
powerControlOffsetSS: db-3 (0)
scramblingID: 43
periodicity AndOffset: slots 160 (10)
   slots 160:0

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for scheduling users comprising:
   a. scheduling users of multiple bandwidth parts (BWPs) at-a-same instant; and
   b. scheduling BWP switching from a default-BWP to a dedicated-BWP using a Radio Resource Control (RRC) Connection Reconfiguration;
   c. configuring BWPs to the following configurations:
   (1) a first BWP configuration having a first band having a wider bandwidth to a downlink BWP and a second band of a smaller bandwidth to an uplink BWP; and
   (2) a second BWP configuration having a first band of a first given width allocated to a downlink BWP and a second band having a second given width to an uplink BWP, the first given width and the second given width being less than the wider bandwidth of the downlink BWP of the first BWP configuration,
   (3) the method further including dynamically switching between the first BWP configuration and the second BWP configuration to increase system capacity.

2. A method for scheduling users comprising:
   a. scheduling multiple users to share a single BWP at-a-same instant; and
   b. scheduling BWP switching of a user from a default-BWP to a dedicated-BWP using a Radio Resource Control (RRC) Connection Reconfiguration;
   c. configuring BWPs to the following configurations:
   (1) a first BWP configuration having a first band having a wider bandwidth to a downlink BWP and a second band having a smaller bandwidth to an uplink BWP; and
   (2) a second BWP configuration having a first band of a first given width allocated to a downlink BWP and a second band of a second given width to an uplink BWP, the first given width and the second given width being less than the wider bandwidth of the downlink BWP of the first BWP configuration;
   (3) the method further including dynamically switching between the first BWP configuration and the second BWP configuration to increase system capacity.

3. The method for scheduling users of claim 1, wherein in the second BWP configuration, the first given width being the same as the second given width.

4. The method for scheduling users of claim 1, wherein the first BWP configuration occupies the full bandwidth on a downlink and is aligned on the center frequency for an uplink; and
   the second BWP configuration being placed anywhere in the wider band.

5. The method for scheduling users of claim 4, the second BWP configuration including two approaches, the two approaches including
   (a) a first approach there are three BWPs of the smaller width,
   (1) a first of the three BWPs having the smaller width resides in the top of the wider band, (2) a second of the three BWPs having the smaller width resides in the middle portion of the wider band, and
(3) a third BWP having the smaller width resides at a bottom portion of the wider band,
while allowing overlaps between the first BWP and the second BWP and between the second BWP and the third BWP;
and
(b) a second approach that includes three discrete BWPs having bands that do not overlap.

6. The method for scheduling users of claim 1, users being scheduled to switch within a Transmission Time Interval (TTI) without being limited by a BWP limit or multi-BWP limit at an instant of scheduling.

7. The method for scheduling users of claim 2, wherein in the second BWP configuration, the first given width being the same as the second given width.

8. The method for scheduling users of claim 2, wherein the first BWP configuration occupies the full bandwidth on a downlink and is aligned on the center frequency for an uplink; and the second BWP configuration being placed anywhere in the wider band.

9. The method for scheduling users of claim 8, the second BWP configuration including two approaches, the two approaches including
(a) a first approach there are three BWPs of the smaller width,
(1) a first of the three BWPs of the smaller width resides in the top of the wider band,
(2) a second of the three BWPs resides in the middle portion of the wider band, and
(3) a third BWP resides at a bottom portion of the wider band,
while allowing overlaps between the first BWP and the second BWP and between the second BWP and the third BWP; and
(b) a second approach that includes three discrete BWPs having bands that do not overlap.

10. The method for scheduling users of claim 2, users being scheduled to switch within a Transmission Time Interval (TTI) without being limited by a BWP limit or multi-BWP limit at an instant of scheduling.

* * * * *